(12) United States Patent
Kawarai

(10) Patent No.: US 9,509,202 B2
(45) Date of Patent: Nov. 29, 2016

(54) VIBRATION GENERATOR

(71) Applicant: SUMIDA Corporation, Tokyo (JP)

(72) Inventor: Mitsugu Kawarai, Tokyo (JP)

(73) Assignee: Sumida Corporation (JP)

( * ) Notice: Subject to any disclaimer, the term of this patent is extended or adjusted under 35 U.S.C. 154(b) by 314 days.

(21) Appl. No.: 14/164,546

(22) Filed: Jan. 27, 2014

(65) Prior Publication Data

US 2014/0139052 A1 May 22, 2014

Related U.S. Application Data

(63) Continuation of application No. PCT/JP2012/055154, filed on Mar. 1, 2012.

(30) Foreign Application Priority Data

Sep. 14, 2011 (JP) .................................. 2011-200939

(51) Int. Cl.
*H02K 41/00* (2006.01)
*H02K 35/02* (2006.01)
*H02K 35/00* (2006.01)
*H02K 41/03* (2006.01)

(52) U.S. Cl.
CPC .............. *H02K 35/02* (2013.01); *H02K 35/00* (2013.01); *H02K 41/00* (2013.01); *H02K 41/03* (2013.01)

(58) Field of Classification Search
CPC ...... H02K 41/03; H02K 35/02; H02K 35/00; H02K 41/00
USPC ............................................ 310/12.01–12.38
See application file for complete search history.

(56) References Cited

U.S. PATENT DOCUMENTS

| 8,674,526 | B2* | 3/2014 | Lemieux | ................ H02K 35/02 290/1 R |
| 2003/0155827 | A1* | 8/2003 | Cheung | ............... F16C 33/1035 310/90.5 |
| 2003/0197433 | A1* | 10/2003 | Cheung | .................. H02K 35/02 310/14 |

(Continued)

FOREIGN PATENT DOCUMENTS

| CN | 201323522 Y | 10/2009 |
| JP | 06-280733 | 10/1994 |
| JP | 2003-116257 A | 4/2003 |

(Continued)

*Primary Examiner* — Joshua Benitez Rosario
*Assistant Examiner* — Leda Pham
(74) *Attorney, Agent, or Firm* — Harness, Dickey & Pierce, P.L.C.

(57) ABSTRACT

The present invention provides such a vibration generator which can obtain desired power-generation efficiency even if the vibration frequency is low. A vibration generator is provided with a vibrator which includes a plurality of magnets whose same magnetic poles are arranged by being faced to one another and which vibrates by a predetermined resonant frequency; a coil spring which supports the vibrator falling toward the gravitational direction and concurrently which vibrates the vibrator by a predetermined resonant frequency; a tubular winding bobbin in the inside of which the vibrator and the coil spring vibrate; coils which are wound on the outer circumference of the winding bobbin and which are connected in series inside groups divided into two or more; and a plurality of rectification circuits, each of which rectifies the output voltages of the coils for every one of the groups.

12 Claims, 7 Drawing Sheets

(56) References Cited

U.S. PATENT DOCUMENTS

| | | | |
|---|---|---|---|
| 2006/0208579 A1* | 9/2006 | Hohberger | H02K 7/1853 310/12.12 |
| 2009/0134721 A1* | 5/2009 | Zimmerling | B06B 1/045 310/15 |
| 2010/0084928 A1* | 4/2010 | Yoshida | H02K 35/02 310/15 |
| 2013/0221768 A1 | 8/2013 | Kawarai | |

FOREIGN PATENT DOCUMENTS

| | | |
|---|---|---|
| JP | 2006-296144 A | 10/2006 |
| JP | 2007-297929 A | 11/2007 |
| JP | 2009-118581 A | 5/2009 |
| JP | 2009-213194 A | 9/2009 |
| JP | 2010-154749 A | 7/2010 |
| JP | 4649668 B2 | 3/2011 |
| WO | WO-2009-057348 A1 | 5/2009 |

* cited by examiner

[CONNECTION EXAMPLE OF COILS RELATING TO FIRST EXEMPLIFIED EMBODIMENT]

[COMPARATIVE EXAMPLE]

[CONNECTION EXAMPLE OF COILS RELATING TO SECOND EXEMPLIFIED EMBODIMENT]

[CONNECTION EXAMPLE OF COILS RELATING TO THIRD EXEMPLIFIED EMBODIMENT]

FIG. 10

EXAMPLE OF COMPARING DC RESISTANCES AND OUTPUTS OF POWER GENERATORS RELATING TO FIRST TO THIRD EXEMPLIFIED EMBODIMENTS (IN CASE OF 4-PIECES OF MAGNETS AND 12-PIECES OF COILS)

|  | DCR($\Omega$) OF COIL GROUP | AMOUNT OF GENERATED ELECTRIC ENERGY (5Hz, STROKE: 20cm)(mW) |
|---|---|---|
| COMPARATIVE EXAMPLE | 220 | 72 |
| POWER GENERATOR RELATING TO FIRST EXEMPLIFIED EMBODIMENT | 110 | 144 |
| POWER GENERATOR RELATING TO SECOND EXEMPLIFIED EMBODIMENT | 73 | 156 |
| POWER GENERATOR RELATING TO THIRD EXEMPLIFIED EMBODIMENT | 55 | 153 |

FIG. 11

EXAMPLE OF COMPARING DC RESISTANCES AND OUTPUTS OF POWER GENERATORS RELATING TO FIRST TO THIRD EXEMPLIFIED EMBODIMENTS (IN CASE OF 12-PIECES OF MAGNETS AND 12-PIECES OF COILS)

|  | DCR($\Omega$) OF COIL GROUP | AMOUNT OF GENERATED ELECTRIC ENERGY (1Hz, STROKE: 50cm)(mW) |
|---|---|---|
| COMPARATIVE EXAMPLE | 220 | 126 |
| POWER GENERATOR RELATING TO FIRST EXEMPLIFIED EMBODIMENT | 110 | 245 |
| POWER GENERATOR RELATING TO SECOND EXEMPLIFIED EMBODIMENT | 73 | 263 |
| POWER GENERATOR RELATING TO THIRD EXEMPLIFIED EMBODIMENT | 55 | 257 |

VIBRATION GENERATOR

CROSS-REFERENCE TO RELATED APPLICATIONS

This application is a continuation of PCT/JP2012/055154 filed Mar. 1, 2012. This application claims the benefit of Japanese Patent Application No. 2011-200939 filed Sep. 14, 2011. The disclosures of the above applications are incorporated herein by reference.

TECHNICAL FIELD

The present invention relates to a vibration generator for carrying out power generation, for example, by a mechanism in which magnets magnetized in the longitudinal direction vibrates as a vibrator within a magneto coil constituted by a plurality of solenoid coils.

BACKGROUND ART

In recent years, mobile electronic equipment such as a mobile-phone, a game machine and the like has spread, and the capacity of the secondary battery which is built-in for those apparatuses has become larger and larger. In addition, along with the development of wireless technology, application of RFID (Radio Frequency Identification) which transmits & receives signals by small electric power has been expanding. In particular, with regard to an active RFID including a power supply, it is possible to carry out also a communication of few-hundreds meters or more. Consequently, expectation has been heightened for the application to the healthcare of cows, horses or the like in a ranch, for the application to safety management at the time of children's going to school and coming back from school, and the like.

On the other hand, for the improvement of maintenance of global environment, there have been actively carried out research and development of a battery and a power generator which have little environmental loads as much as possible. Within those matters, there has been reviewed a matter in which energy, which was consumed unconsciously and also fruitlessly in the past, is converted to electric energy and is charged in a secondary battery, wherein this electric energy is utilized as a power supply for electronic equipment or the like. As one example of such a power generator, it becomes a situation in which there has been devised a constitution of a vibration generator which converts vibration energy applied from the outside into electric energy and charges the energy in a secondary battery.

In Patent Document 1, there is disclosed a vibration generator which is provided with a vibrator composed of magnets whose same magnetic poles are faced to each other, a pipe for housing the vibrator and coils wound on the outer circumference of the pipe.

PRIOR-ART DOCUMENT

Patent Document

Patent Document 1: Japanese unexamined patent publication No. 2006-296144

DISCLOSURE OF THE INVENTION

Problem to be Solved by the Invention

Meanwhile, in the past, there was an observation apparatus referred to as a marine buoy which transmits positional information of the own apparatus or the like from the sea by utilizing GPS information. This observation apparatus is an apparatus used by being floated on the sea and various kinds of components of the observation apparatus are operated by being provided with a battery. However, this observation apparatus is generally floated on a deep-sea, so that the maintenance thereof is not easy. Consequently, it was desired that maintenance-free can be obtained as much as possible by loading a battery of large capacity into the observation apparatus.

Also, in order to make it possible to generate electricity by utilizing waves of the sea, it was reviewed that the vibration generator disclosed in the Patent Document 1 is to be installed in the marine buoy beforehand. However, when installing a conventional vibration generator in an observation apparatus, it became clear that the generation efficiency will decline in the cases which are shown in the following (1) and (2) items.

(1) The size of the observation apparatus is restricted and various devices are installed inside the apparatus, so that there is restriction for the space in which the winding wire formed by an electrical conductive wire, which is wound-around by a predetermined number of turns, can be installed. Consequently, when connecting all the coils in series, the DCR (DC resistance) becomes higher and the generation efficiency of the electric power obtained from the coils is decreased. On the other hand, when enlarging the diameter of the electrical conductive wire in order to decrease the DCR, the number of turns of the winding wire becomes fewer, so that there occurs a situation in which the generation efficiency is decreased and the output will be decreased.

(2) The frequency caused by the vibration of the waves is lower by one digit compared with the motion of a human being and, for example, it is 1 Hz or less at most. In the bandwidth of such a low resonant frequency, the moving speed of the vibrator becomes lower due to the structure of a conventional vibration generator, so that the output voltage of the vibration generator lowers and the amount of the generated electric energy becomes less.

Here, the resonant frequency fr is given by the following formula (1). This formula is a formula expressing the resonant frequency fr of the resonant system which is constituted by hanging a weight having mass M onto a coil spring having spring constant k.

[Math. 1]

$$f_r = \frac{1}{2\pi}\sqrt{\frac{k}{M}} \quad (1)$$

For example, in a vibration generator in the past, the resonant frequency of the vibrator was several Hz or more. Consequently, the vibration which becomes usable for the power generation was a vibration of a motor, a vibration of a bicycle/automobile or a vibration of human-walking. Consequently, when using a vibration generator in the past for an observation apparatus floating on the sea which has only the waves whose frequency is 1 Hz or less, it was impossible to obtain desired power-generation efficiency.

Consequently, when increasing the number of coils of the vibration generator, the output voltage uprises as described above, so that it is considered that the power generation efficiency of the vibration generator uprises and it is possible to increase the amount of the generated electric energy of the vibration generator. However, actually, also the DCR of the coil uprises, so that there occurs a situation in which the voltage drop of the coil becomes larger and the power generation efficiency does not uprise so much. In addition, when trying to suppress the DCR by designing the wire diameter of the winding wire to be thicker, the coil itself becomes enormous and therefore, it becomes difficult to be mounted on the observation apparatus.

The present invention was invented in view of such a situation and is addressed to obtain such a vibration generator which can obtain desired power generation efficiency even if the vibration frequency is low.

Means for Solving the Problem

The vibration generator of the present invention is a vibration generator including: a vibrator including a plurality of magnets whose same magnetic poles are arranged by being faced to one another; a first elastic unit which supports the vibrator that falls toward the gravitational direction and concurrently, which vibrates the vibrator by a predetermined resonant frequency; a tubular winding bobbin in the inside of which this vibrator and the first elastic unit vibrate; a plurality of coils which are formed on the outer circumferential surface of the winding bobbin and which are divided into two or more groups and are connected in series in the inside of each group; and a plurality of rectification circuits, each of which rectifies the output voltages of the coils in every group.

Effect of the Invention

According to the present invention, by being provided with a plurality of coils which are divided into two or more groups and which are connected in series in the inside of each group, it is possible to output a power-generation voltage which the coils generate for every group. Consequently, it is possible to heighten the power-generation voltage while suppressing the DC resistance of the coil.

BRIEF DESCRIPTION OF DRAWINGS

FIG. 10 is an explanatory diagram showing an example of comparing the DC resistances and the amounts of the generated electric energies of a comparative vibration generator which has 4-pieces of magnets and 12-pieces of coils with those of the vibration generators relating to the first to third exemplified embodiments of the present invention;

FIG. 11 is an explanatory diagram showing an example of comparing the DC resistances and the amounts of the generated electric energies in a case in which the magnets are 12-pieces and the coils are 12-pieces for the vibration generators relating to the first to third exemplified embodiments of the present invention.

MODE FOR CARRYING OUT THE INVENTION

1. First Exemplified Embodiment

Figure 1:
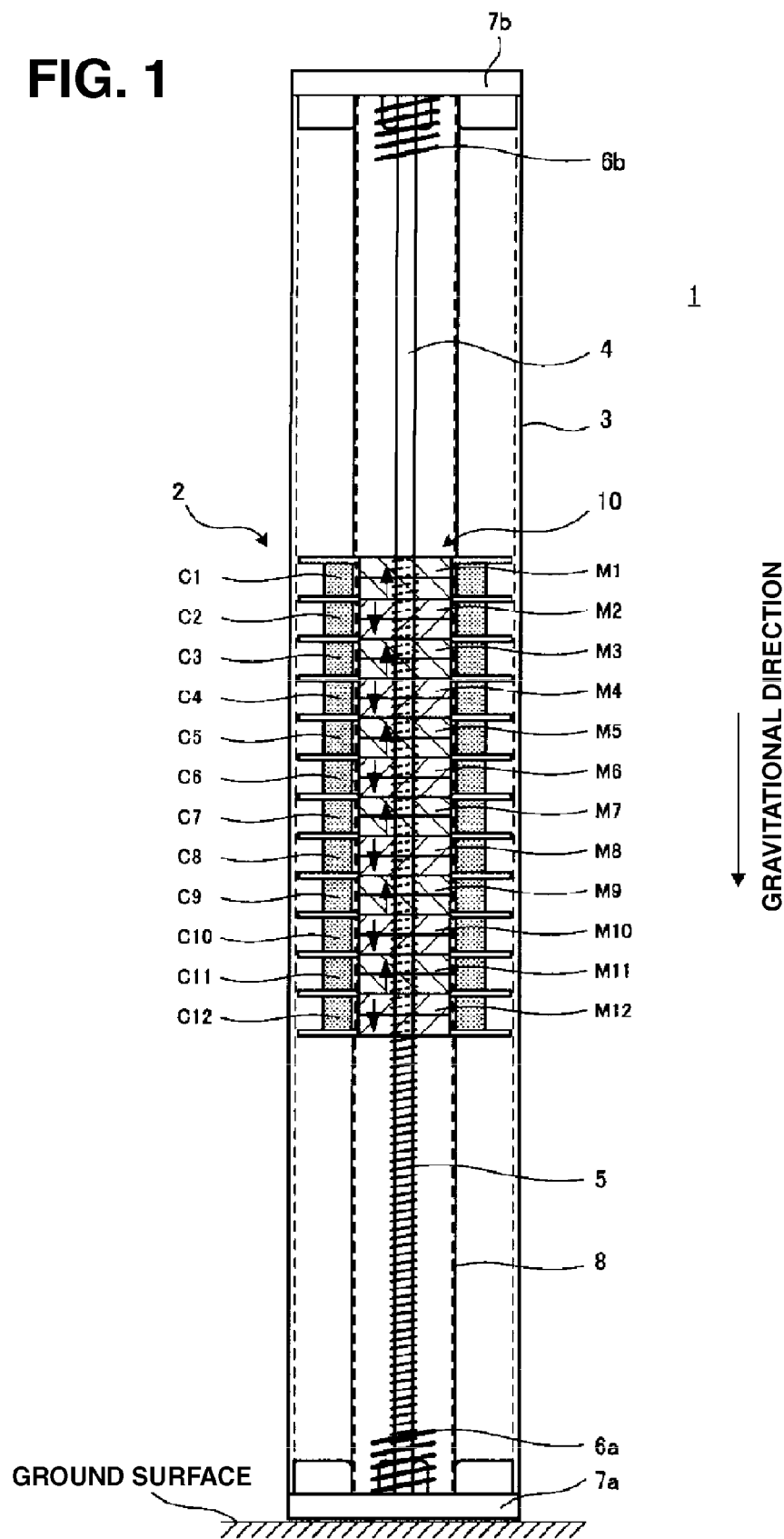
FIG. 1 is a cross-sectional view showing a constitution example of a vibration generator relating to a first exemplified embodiment of the present invention.

Hereinafter, there will be explained a constitution example of a vibration generator 1 relating to a first exemplified embodiment of the present invention with reference to FIGS. 1 to 5. In the explanation hereinafter, an arrow showing the gravitational direction will be denoted in the drawing. Then, there is a case in which the explanation will be carried out by naming the direction toward which the arrow is directed as "lower side".

FIG. 1 is a cross-sectional view showing a structure of the vibration generator 1.

The vibration generator 1 is provided with a hollow exterior case 3 which is formed by a non-magnetic material and a magneto coil 2 which is installed in the inside of the exterior case 3. Also, there are provided a coil spring 5, which is installed on the lower side of the exterior case 3 and which is used as a first elastic unit, and a vibrator 10 which is movable up and down in the inside of the exterior case 3 caused by the vibration of the coil spring 5.

The exterior case 3 is used as a tubular housing unit which houses the vibrator 10 in the inside thereof. In the inside of the exterior case 3, there is installed a tubular winding bobbin 8 in the inside of which the vibrator 10 and the coil spring 5 vibrates. The winding bobbin 8 is formed by a material having non-magnetic property and also having insulation property (for example, plastic having excellent slidability). Around the winding bobbin 8, electrical conductive wires are wound and there is formed the magneto coil 2 which is provided with a plurality of coils C1 to C12. The exterior case 3 is used as a housing unit which houses the winding bobbin 8.

It should be noted that the exterior case 3 has various functions not only as a waterproof unit but also as an undermentioned container which houses a support unit 4, the coil spring 5, end-portion springs 6a, 6b and the vibrator 10 or as an attachment base for the support unit 4, the coil spring 5 and the end-portion springs 6a, 6b. However, in the inside of a marine buoy, if there is provided a housing unit which has an excellent waterproof-performance and which is provided with a space for the support unit 4, the coil spring 5 and the end-portion springs 6a, 6b to be attached between the both ends thereof, it is allowed even if the exterior case 3 is not employed. It is necessary for the material of the winding bobbin to be a material having insulation property, and for preferable materials among resins, there can be cited a polyacetal based raw material and a polytetrafluoroethylene based raw material which is known by the fact of having low friction coefficient.

On the both ends of the exterior case 3, there are attached lid units 7a, 7b for preventing the vibrator 10 from running out toward the outside of the exterior case 3. At the centers of the lid units 7a, 7b, there are formed projections for respectively supporting the end-portion springs 6a, 6b which are used as second elastic units. The end-portion springs 6a, 6b are compression springs, which are arranged inside the both ends of the exterior case 3 and concurrently, each of which has an inner diameter larger than the outer diameter of the coil spring 5. Then, one end of the coil spring 5 is connected to one end of the exterior case 3 by being passed through a core portion of the end-portion spring 6a and the other end of the coil spring 5 is connected to the vibrator 10.

Consequently, the end-portion springs 6a, 6b have a function for pushing-back the vibrator 10 when the vibrator 10 approaches either one of the end portions of the exterior case 3 too close. The diameters of the projections formed at the lid units 7a, 7b and those of the end-portion springs 6a, 6b are designed to be approximately equal and therefore, the end-portion springs 6a, 6b are fixed on the projections reliably. In addition, even if a vibration for a long period is applied to the vibration generator 1, the end-portion springs 6a, 6b do not drop out from the projections.

With regard to the vibrator 10, a plurality of ring-shaped magnets M1 to M12, whose same magnetic poles are arranged by being faced to one another, are fixed while maintaining the adjacent positions of mutually reversed polarities and the outer circumferential surface of the vibrator 10 is formed so as to slide with respect to the inner circumferential surface of the winding bobbin 8. In addition, with regard to the magnets M1 to M12 which constitute the vibrator 10, there are formed through-holes for making the support unit 4 insertable. Consequently, the diameter of the holes formed for the magnets M1 to M12 is a little bit larger than the diameter of the support unit 4. Also, the inner diameter of the compression-type coil spring 5 is larger than the diameter of the through-hole of the vibrator 10. Consequently, friction of the vibrator 10 with respect to the winding bobbin 8 and the support unit 4 becomes small, and there can be obtained such an advantage that the slidability of the vibrator 10 is to be improved.

The winding directions of the electrical conductive wires which form the plurality of adjacent coils C1 to C12 are constituted to be alternate directions of forward & reverse & forward & reverse . . . . In addition, the winding directions of the electrical conductive wires in different groups are mutually reversed for every two adjacent groups. Further, the coils C1 to C12 are divided into two or more groups and two or more coils are connected in series within each group.

In the inside of the exterior case 3, there is inserted the vibrator 10 in which the plurality of magnets M1 to M12 magnetized in the longitudinal direction are coupled and when a vibration is applied from the outside of the vibration generator 1, the vibrator 10 vibrates upward & downward caused by the action of the coil spring 5. The arrow toward the up & down direction of the magnets M1 to M12, which is shown in the drawing, indicates the direction of the magnetic fields of the magnets which are magnetized in the longitudinal direction respectively.

The coil spring 5 is a spring which supports the vibrator falling in the gravitational direction and concurrently, which vibrates the vibrator 10 by a predetermined resonant frequency. Then, the coil spring 5 is supported by the vibrator 10 and the support unit 4 which is passed through the core axes of the first and second elastic units. Then, the coil spring 5 is always made to be in a compression state with respect to the natural length of the coil spring 5 at all the positions inside the exterior case 3, at which it becomes possible for the vibrator 10 to move. Consequently, the vibrator 10 is supported by the coil spring 5 so as to vibrate in the winding axis direction of the magneto coil 2 and it is possible for the vibrator 10 to move upward & downward in the inside of the exterior case 3.

Also, in case of using a compression spring for the coil spring 5, the length of the compression spring is designed so as to always obtain a compression force from the compression spring when the vibrator 10 moves inside the exterior case 3. In this case, it is allowed not to form, in particular, hooks, slim holes or the like which combine between the compression spring and the vibrator 10 and between the compression spring and the exterior case 3. Consequently, there can be obtained such an advantage in which it is possible to reduce the processes or the components for forming the hooks, the slim holes or the like. Also, the coil spring 5 is constituted to have a length of approximately 80 cm in a state of the natural length thereof and when it is placed inside the exterior case 3 and the vibrator 10 is inserted from the upper portion, the coil spring 5 is compressed to have a length of approximately 20 cm. Then, there is employed a constitution in which the vibrator 10 will vibrate upward & downward along with a phenomenon that the coil spring 5 is expanded & contracted when receiving an external vibration.

The assembly of the vibration generator 1 is carried out by a process in which a lid unit 7a is fitted into one side of the end portions of the exterior case 3 and thereafter, the coil spring 5, the vibrator 10 and the winding bobbin 8 are inserted inside the exterior case 3 in this order and finally, the exterior case 3 is sealed by a lid unit 7b. The assembly of the vibration generator 1 is completed only by going through this assembly process, so that the assembly is very easy.

Figure 2:
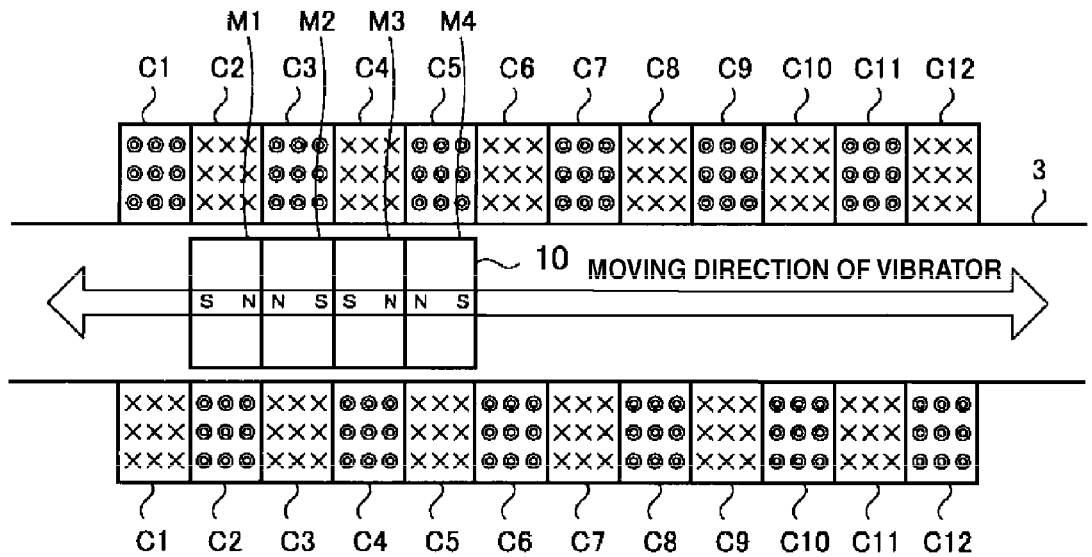
FIG. 2 is a cross-sectional view showing an arrangement example of coils and a vibrator which are included in the vibration generator relating to the first exemplified embodiment of the present invention.

FIG. 2 shows an arrangement example of coils C1 to C12 and magnets M1 to M4, which are included in the vibration generator 1.

Here, there will be explained an example of the vibrator 10 in a case in which the vibrator 10 is constituted by 4-pieces of magnets M1 to M4. However, it is allowed for the vibrator 10 to be constituted by 12-pieces of magnets M1 to M12. As shown in FIG. 1, when the vibration is applied to the vibration generator 1, the vibrator 10 moves in the inside of the coils C1 to C12 along the center axis direction of the coils C1 to C12. At that time, it is possible to output an AC voltage which occurs caused by the coils C1 to C12 and the magnets M1 to M4 due to the electromagnetic induction therebetween.

In this manner, there is used a vibrator 10 including a plurality of magnets whose same magnetic poles are faced to one another, and there are arranged coils, each of which is designed to have thickness approximately equal to a magnet pitch between the adjacent magnets, such that the adjacent coils will have mutually reverse winding directions. Then, it is possible to heighten the power-generation output of the vibration generator by a configuration in which the vibrator carries out reciprocating movement in the central core portions of the coils.

Further, on an occasion when designing the vibration generator 1, the inventor of the present invention carried out a study also with regard to a connection method between the coils C1 to C12 and rectification circuits.

Figure 3:
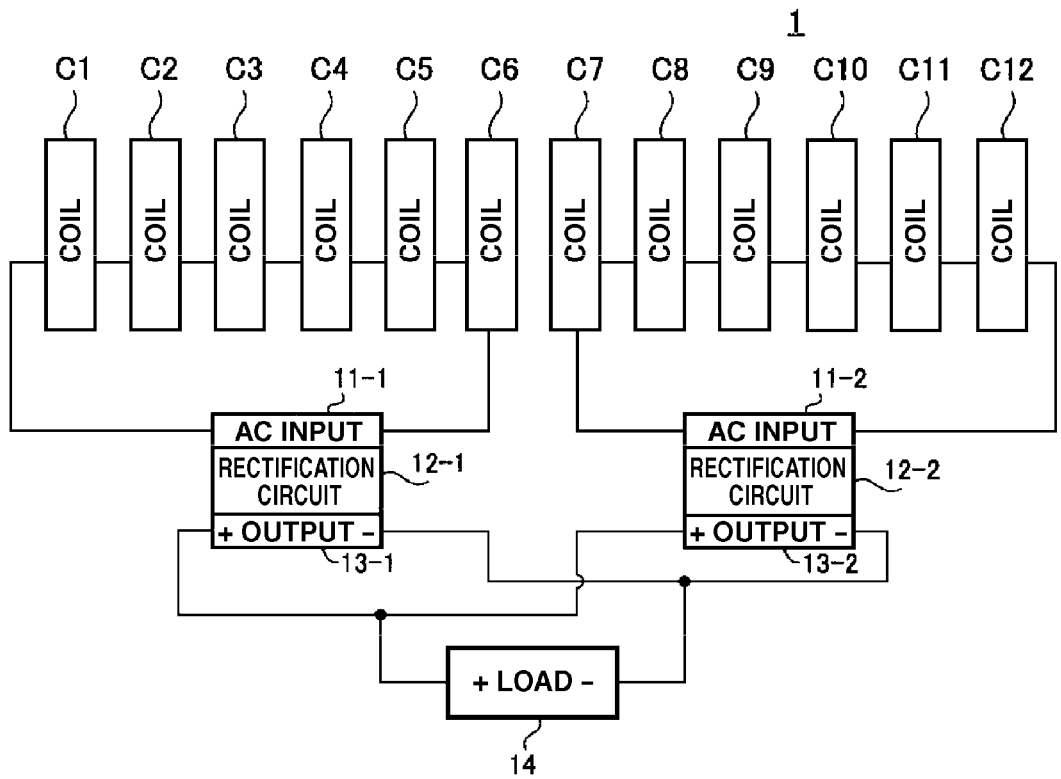
FIG. 3 is a block diagram showing a connection example between the coils and a load relating to the first exemplified embodiment of the present invention.

FIG. 3 is a block diagram showing an internal-constitution example of the vibration generator 1.

In the past, a plurality of coils are all connected in series and there was employed a configuration of deriving the output voltage from the coils at the both ends thereof. In order to make the amount of the generated electric energy larger, it is effective to convert kinetic energy of the vibrator into the electric power efficiently, so that there existed a method in which the number of coils is increased. However, in case of increasing the number of coils by the coil connection method in the past, there was such a defect that the DC resistance increases in proportion to the number of coils, a voltage drop caused by this DC resistance of the coils becomes large and it is impossible to make the amount of the generated electric energy large as been expected.

Consequently, in the vibration generator 1 relating to this exemplified embodiment, there is employed a constitution in which a plurality of coils, which are adjacent to one another, are divided into a plurality of groups; power-generation outputs are derived from the both ends of the coils included in the respective groups; and thereafter, the power-generation outputs of the plurality of groups are to be combined. Thus, it is possible to increase the number of coils without increasing the DC resistance and it became possible to make the amount of the whole generated electric-energy larger effectively. However, in order to prevent the power-generation outputs for the respective groups from interfering with one another, it is necessary to combine the outputs after being rectified by semiconductor elements.

More specifically, by dividing the coils C1 to C12 for every 6 pieces, there are formed two groups which include the coils C1 to C6 and the coils C7 to C12 respectively. Then, the vibration generator 1 is provided with rectification circuits 12-1, 12-2 for rectifying the output voltages of the coils for the respective groups. Also, the rectification circuits 12-1, 12-2 are respectively provided with AC input units 11-1, 11-2 for which AC voltages are inputted; and rectification output units 13-1, 13-2 for outputting rectification voltages obtained by rectifying the AC voltages.

To the rectification output units 13-1, 13-2, there is connected a load 14 composed of a radio wave transmitter or the like. Then, the groups in each of which a plurality of coils are connected in series and a plurality of rectification circuits 12-1, 12-2 which are provided for the respective groups are arranged in parallel with respect to the load 14. When the rectification voltages outputted by the rectification output units 13-1, 13-2 are inputted to the load 14, the load 14 operates and transmits positional information or the like, which is superimposed on the radio wave.

As described above, in the vibration generator in the past, the vibrator is suspended by a spring or the like and the vibrator vibrates by being applied with the vibration from the outside, and electricity generation was carried out. At that time, by making the vibrator vibrate in a sine-wave with a frequency that is the same frequency or more of the resonant frequency of the vibrator which is used for the vibration generator in the past, an electromotive force was generated in the coil and there was obtained the power-generation output was obtained. However, in a case in which the frequency of the vibration applied from the outside is lower than the resonant frequency of the vibrator, the vibrator is displaced with the same frequency as that of the housing which houses the coil, so that there is no relative movement between the coil and the vibrator and it is not possible to carry out the power generation. It should be noted that the displacement named here indicates a relative amount of displacement between the coil and the vibrator.

On the other hand, the electric voltage accompanied by the power-generation output of the vibration generator 1 is in proportion to moving speed $v_{mag}$ of the vibrator 10 which moves inside the coils C1 to C12. Here, the following formula (2) expresses a power-generation voltage V and the following formula (3) expresses the moving speed $v_{mag}$ of the vibrator 10.

[Math. 2]

$$V = -n \frac{d\Phi}{dt} \qquad (1)$$

Φ: Magnetic Flux inside the Coil, which is generated from the Magnets
n: Number of Windings of the Electrical Conductive Wire

[Math. 3]

$$\frac{d\Phi}{dt} \propto V_{mag} \qquad (3)$$

Φ: Magnetic Flux inside the Coil, which is generated from the Magnets
$v_{mag}$: Moving Speed of Magnetic Flux As shown by the formula (2), the power-generation voltage V of the vibration generator 1 is in proportion to a value obtained by multiplying time derivative in the inside of the coils C1 to C12 of the magnetic flux generated from the magnets M1 to M12 in the vibrator 10 by the number of windings of the electrical conductive wire. Also, as shown by the formula (3), the time derivative of the magnetic flux is in proportion to the moving speed $v_{mag}$ of the vibrator 10 which includes the magnets M1 to M12. More specifically, in accordance with the vibration frequency which becomes lower, the moving speed $v_{mag}$ of the vibrator 10 becomes slower and in order to obtain a perfect vibration wave, it is necessary to lengthen the amplitude of the vibrator 10. However, in order to lengthen the amplitude of the vibrator 10, it is necessary to lengthen the whole length of the exterior case 3 which houses the vibrator 10 and there occurs a situation in which the vibration generator 1 will be large-sized.

Here, it is supposed that the vibration generator 1, which carries out the power generation by utilizing the vibration of the wave, is disposed in an observation apparatus represented by a marine buoy or the like. Generally, for the vibration of the sea-wave, there exists a vibration of a short period gravity wave, a gravity wave, a long period gravity wave, a long period wave, a surface tension wave, a tidal wave or the like, and it is known that the vibration of the wave, which is observed regularly and also whose frequency is high, has a frequency of around 0.5 Hz to 2 Hz. Therefore, in case of utilizing the wave in order to vibrate the vibrator 10 of the vibration generator 1, it is necessary to design the resonant frequency between the vibrator 10 suspended by a spring or the like and the coil spring 5 to be approximately 1 Hz or less, and if possible, to be around 0.5 Hz.

In this manner, for the vibration system including the vibrator 10, which uses an external vibration having a low resonant frequency compared with that of the system in the past, the amplitude of the vibration of the vibrator 10 becomes long and the whole length of the vibration generator 1 (of the exterior case 3) becomes very large, so that this becomes a large demerit in view of the cost, the strength, the weight and the like. Consequently, it was found out that it becomes possible to shorten the whole length of the vibration generator 1 by reducing the amplitude of the vibrator 10 while maintaining the moving speed of the vibrator 10 depending on a configuration in which the vibration of the vibrator 10 is designed to have approximately a rectangular wave but not to have a sinusoidal wave.

More specifically, there is employed a configuration in which the vibrator 10 suspended by the coil spring 5, in which the resonant frequency is designed to be 0.5 Hz, is manufactured and there are arranged the end-portion springs 6a, 6b or the like at the end portions of the amplitude obtained within the whole length in which this vibrator is restricted. Thus, the end-portion springs 6a, 6b restrict the movement of the vibrator 10. In this manner, it becomes a situation in which by the vibration from the outside, the vibrator 10 will carry out a rectangular-wave shaped vibration spuriously within the amplitude thereof.

By vibrating the vibrator 10 in a rectangular-wave shape in this manner, it is possible to maintain the necessary moving speed required for the vibrator 10 which moves inside the coils C1 to C12 without designing the vibration generator 1 in a large size. As a result thereof, it is possible to obtain the vibration generator 1 which can obtain a sufficient power-generation output.

Figure 4:
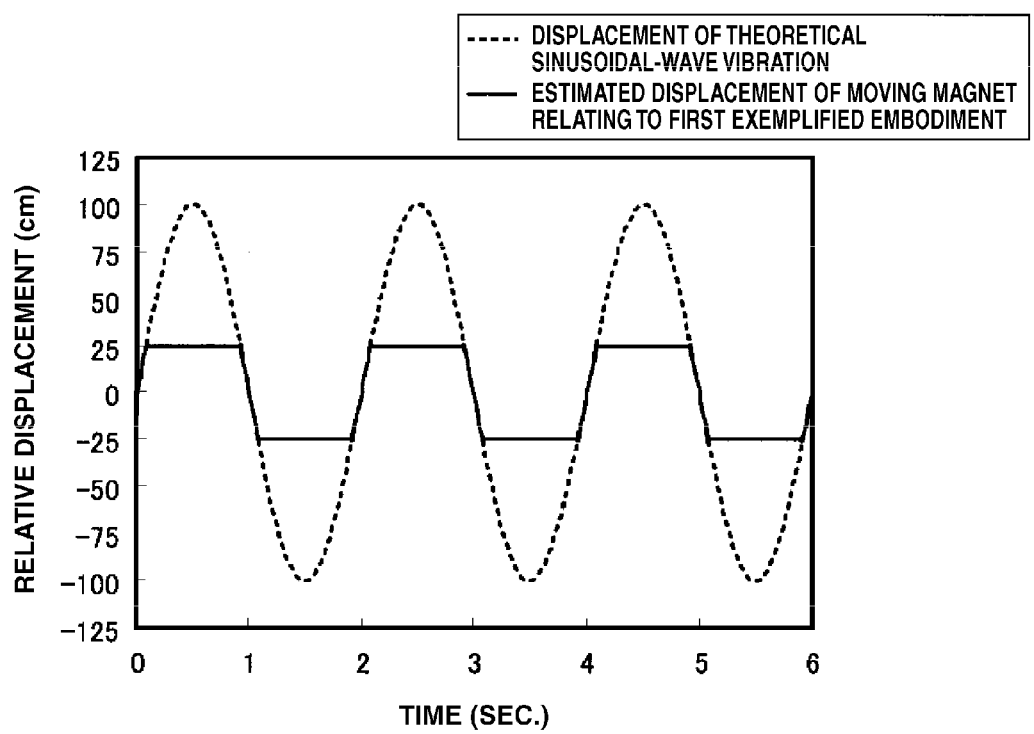
FIG. 4 is an explanatory diagram showing an aspect in which a vibrator is displaced in the inside of a pipe relating to the first exemplified embodiment of the present invention.

FIG. 4 shows an aspect in which the vibrator 10 is displaced in the inside of the exterior case 3.

In FIG. 4, there are concurrently presented a graph which shows the displacement of a theoretical sinusoidal-wave vibration by a broken line and a graph which shows the displacement to be estimated when the vibrator 10 relating to the first exemplified embodiment moves in the coils C1 to C12 by a solid line.

Here, it is expected for the displacement of the sinusoidal-wave vibration shown by a broken line to have a cycle of 2-seconds and to have a relative displacement of around ±100 cm. On the other hand, it is expected for the estimated displacement shown by a solid line to have a cycle of 2-seconds and to have a relative displacement of around ±25 cm, because the vibrator 10 is restricted for the vibration thereof by the end-portion springs 6a, 6b. Then, 1-cycle of the estimated displacement requires approximately 2-seconds, so that it is understandable that the vibration frequency of the vibrator 10 is approximately 0.5 Hz. Consequently, by lengthening the 1-cycle of the estimated displacement, it is possible to reduce the vibration frequency of the vibrator 10 to be less than 1 Hz.

Figure 5:
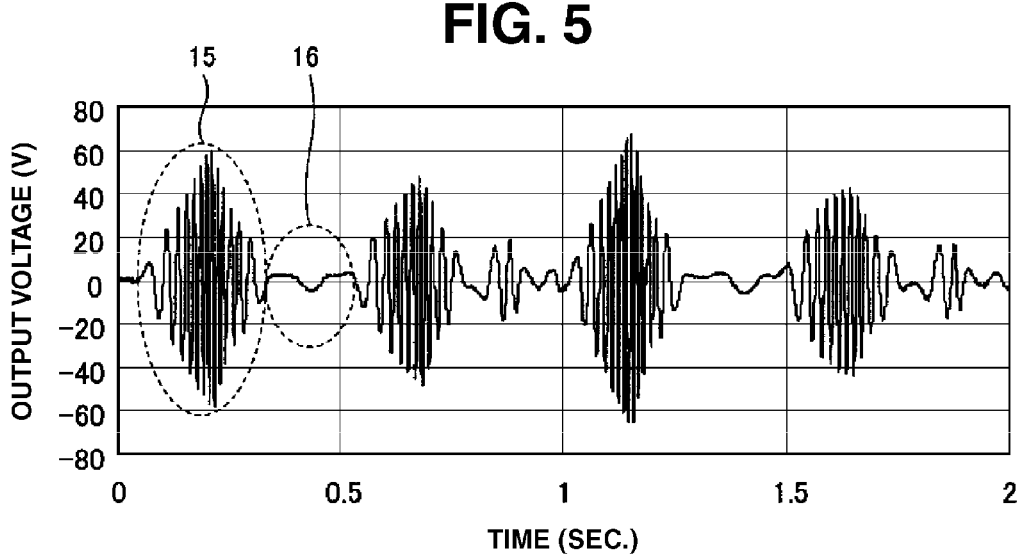
FIG. 5 is an explanatory diagram showing an example of a voltage waveform of an output voltage when the vibration generator relating to the first exemplified embodiment of the present invention vibrates caused by the waves.

FIG. 5 shows an example of a voltage waveform of an output voltage when the vibration generator 1 vibrates caused by the waves.

In this voltage waveform, during an interval 15, the vibrator 10 is in a state of movement in the inside of the coils C1 to C12, so that there is shown a phenomenon that output voltages are generated. It should be noted that during an interval 16, the vibrator 10 is in a state of being pressed onto either one of the end-portion springs 6a, 6b and is not in a state of moving, so that there is shown a phenomenon that the output voltage is not generated. If charging a secondary battery, which is not shown, by the output voltage generated in this manner, it is possible, even if the output voltage generated for every one-time vibration is little, to charge an electric power sufficient for operating the electronic equipment shown by the load 14 (approximately 0.3 W) into the secondary battery and to derive the power after a predetermined period of time.

Here, in order to make comparison of the power-generation efficiency of the vibration generator 1 relating to the first exemplified embodiment, there will be explained a constitution of a vibration generator 100 in the past and a waveform of an output voltage thereof with reference to FIG. 6 and FIG. 7. In the explanation hereinafter, portions which were already explained for the first exemplified embodiment are attached with the same reference numerals and detailed explanations thereof will be omitted.

Figure 6:
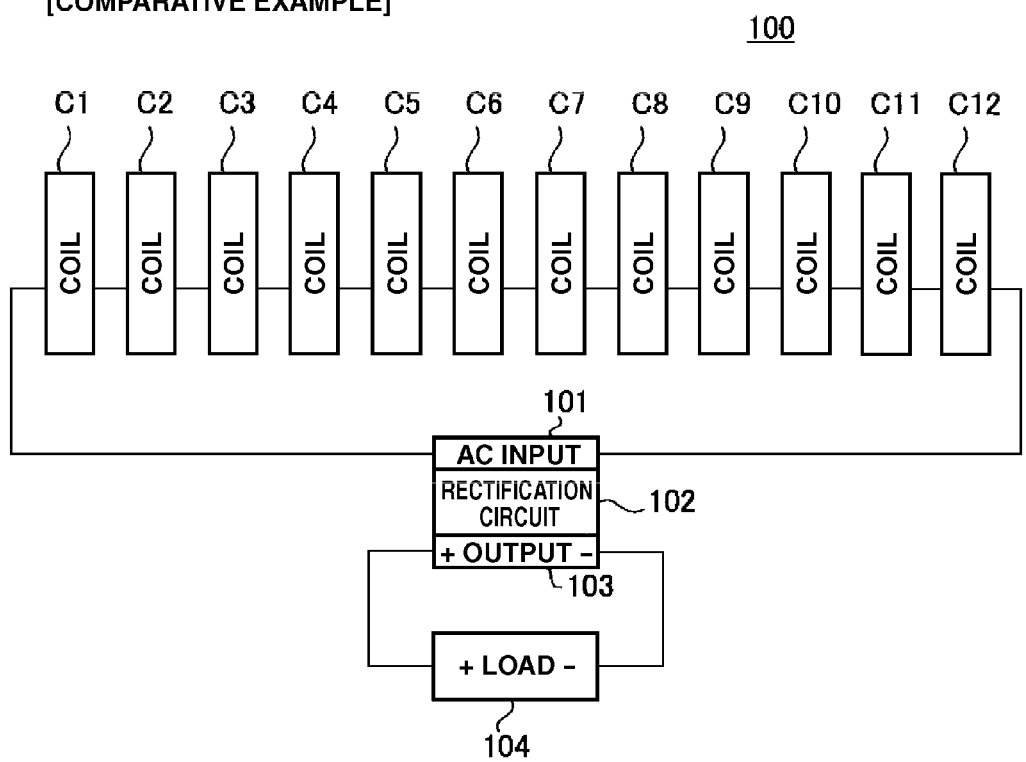
FIG. 6 is a block diagram showing a connection example of coils in the past.

FIG. 6 shows an example of deriving an electric power from coils C1 to C12 which are connected in series.

In addition to the coils C1 to C12 which are connected in series, the vibration generator 100 in the past is provided with an AC input unit 101 inputted with the AC voltage from the coils C1 to C12, a rectification circuit 102 for rectifying the AC voltage, and an rectification output unit 103 which outputs a rectification voltage. Then, to the rectification output unit 103, there is connected a load 104 composed of a radio wave transmitter or the like and when the rectification voltage outputted by the rectification output unit 103 is inputted to the load 104, the load 104 is operated.

Figure 7:
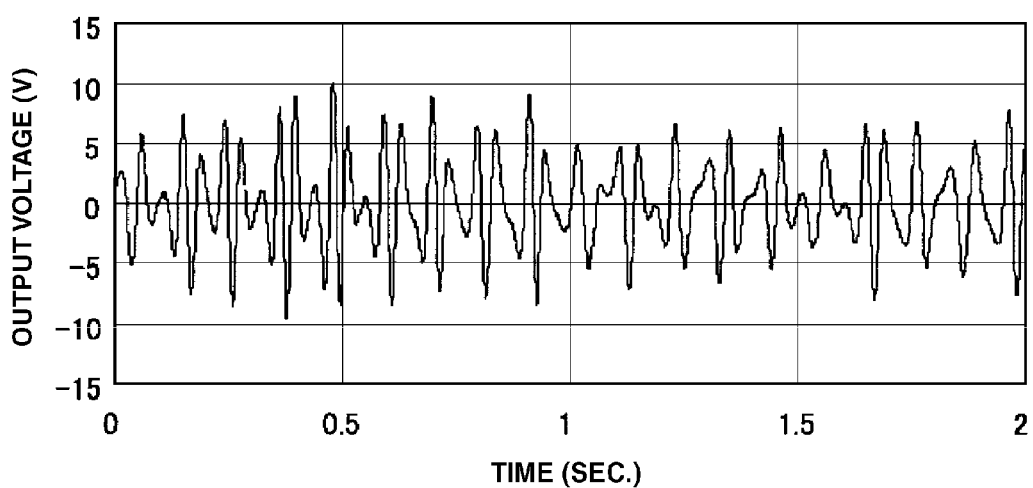
FIG. 7 is an explanatory diagram showing an example of a voltage waveform outputted from a vibration generator in the past in a case in which the vibration frequency is approximately 4 Hz.

FIG. 7 shows an example of a voltage waveform of an AC voltage outputted from the vibration generator 100 in the past in a case in which the vibration frequency is approximately 4 Hz.

In the vibration generator 100 in the past, there was employed a design in which the vibrator 10 does not collide with either one of the both end portions of the exterior case 3 and it is possible to generate electricity by a high vibration frequency. Then, the vibration generator 100 derives an output voltage from the coils C1 to C12 which are connected in series. However, even if using the vibration generator 100 in the past for the observation apparatus which is floating on the sea, the vibrator 10 does not vibrate, because the frequency of the wave is lower than the vibration frequency. Also, within the coils C1 to C12, there is a case in which a certain one coil outputs a positive voltage and simultaneously, another certain coil outputs a negative voltage. For this reason, the voltages are cancelled each other and the output voltage of the vibration generator 100 becomes low compared with that of the vibration generator 1 relating to this exemplified embodiment.

2. Second Exemplified Embodiment

Next, there will be explained an internal-constitution example of a vibration generator 20 relating to a second exemplified embodiment of the present invention.

Figure 8:
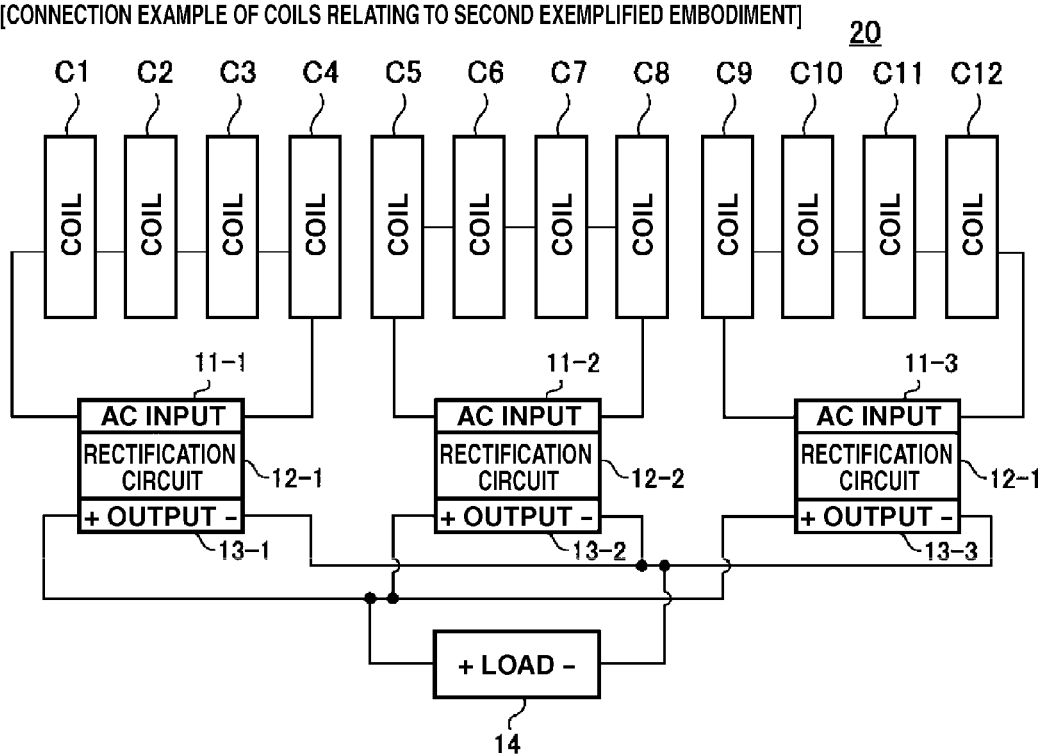
FIG. 8 is a block diagram showing a connection example of coils relating to a second exemplified embodiment of the present invention.

FIG. 8 is a block diagram showing an internal-constitution example of the vibration generator 20.

The vibration generator 20 is in common with the vibration generator 1 in an aspect that there are provided with the coils C1 to C12, but different in an aspect that the power-generation voltages are outputted by coil groups which have four coils seperatively.

For a first group, the vibration generator 20 is provided with coils C1 to C4 which are connected in series, an AC input unit 11-1 which is connected to the end portions of the coils C1 to C4, a rectification circuit 12-1 for rectifying an AC voltage inputted to the AC input unit 11-1 and a rectification output unit 13-1 for outputting the rectification voltage rectified by the rectification circuit 12-1. Similarly, for a second group, the vibration generator 20 is provided with coils C5 to C8, an AC input unit 11-2, a rectification circuit 12-2 and a rectification output unit 13-2, and for a third group, there are provided with coils C9 to C12, an AC input unit 11-3, a rectification circuit 12-3 and a rectification output unit 13-3. Then, the both end portions of each of the rectification output units 13-1 to 13-3 are connected to the load 14 respectively.

3. Third Exemplified Embodiment

Next, there will be explained an internal-constitution example of a vibration generator 30 relating to a third exemplified embodiment of the present invention.

Figure 9:
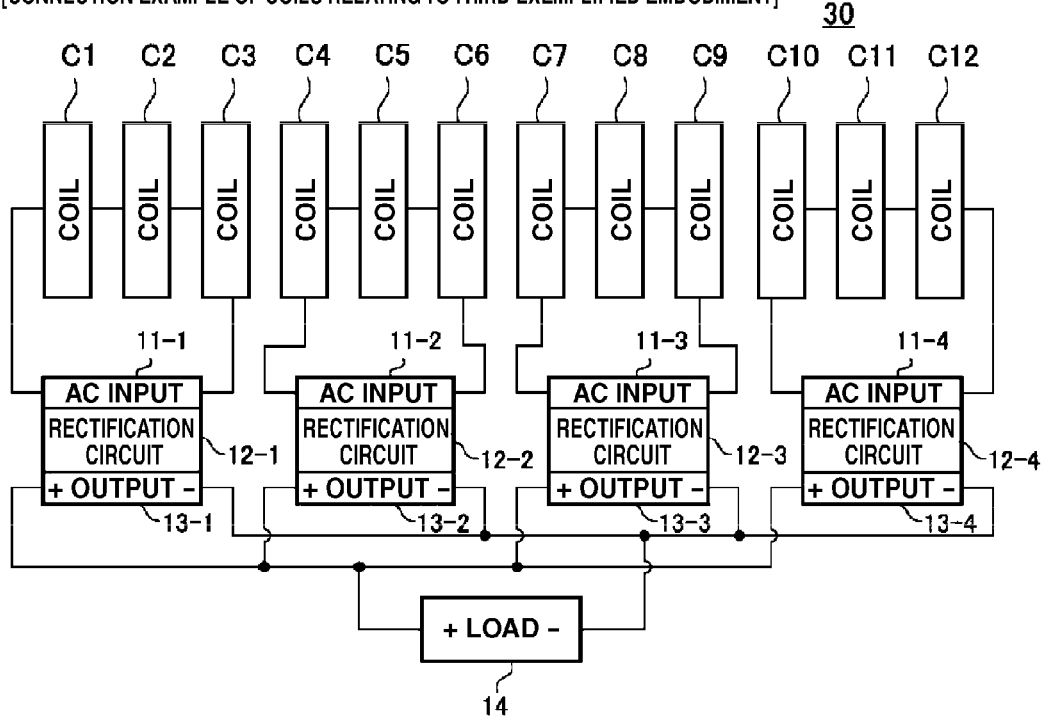
FIG. 9 is a block diagram showing a connection example of coils relating to a third exemplified embodiment of the present invention.

FIG. 9 is a block diagram showing an internal-constitution example of the vibration generator 30.

The vibration generator 30 is in common with the vibration generator 1 in an aspect that there are provided with the coils C1 to C12, but different in an aspect that the power-generation voltages are outputted by coil groups which have three coils seperatively.

For a first group, the vibration generator 30 is provided with coils C1 to C3 which are connected in series, an AC input unit 11-1 which is connected to the end portions of the coils C1 to C3, a rectification circuit 12-1 for rectifying an AC voltage inputted to the AC input unit 11-1 and a rectification output unit 13-1 for outputting the rectification voltage rectified by the rectification circuit 13-1. Similarly, for a second group, the vibration generator 30 is provided with coils C4 to C6, an AC input unit 11-2, a rectification circuit 12-2 and a rectification output unit 13-2, and for a third group, there are provided with coils C7 to C9, an AC input unit 11-3, a rectification circuit 12-3 and a rectification output unit 13-3, and for a fourth group, there are provided with coils C10 to C12, an AC input unit 11-4, a rectification circuit 12-4, a rectification output unit 13-4. Then, the both end portions of each of the rectification output units 13-1 to 13-4 are connected to the load 14 respectively.

4. Example of Comparing DC Resistances and Amounts of Generated Electric Energies FIG. 10 shows an example of comparing the DC resistances and the amounts of generated electric energies of a comparative vibration generator which has 4-pieces of magnets and 12 pieces of coils with those of the vibration generators relating to the first to third exemplified embodiments of the present invention.

Here, there is shown a comparison between the power-generation outputs of the vibration generators relating to the first to third exemplified embodiments, in which the vibrator 10 is provided with 4-pieces of magnets M1 to M4, and that of the power-generation output of the vibration generator 100 in the past (referred to as "comparative example" in the drawing). At that time, it is assumed with regard to the vibrator 10 that the resonant frequency thereof is 5 Hz and the possible vibration amplitude thereof is 20 cm.

With regard to the vibration generator 100 in the past (see FIG. 6), 12-pieces of coils C1 to C12 are connected in series and therefore, the DCR becomes the highest and the amount of the generated electric energy becomes the lowest.

On the other hand, with regard to the vibration generators 1, 20, 30 relating to the first to third exemplified embodiments respectively, the DCRs thereof become lower in this order and any one of those has twice or more amount compared with the amount of the generated electric energy of the vibration generator 100 in the past, so that it is understandable that their power-generation outputs are larger. It should be noted that when the number of the group-divisions increases, the number of the rectification circuits which are provided for every group also increases, but at that time, since the amount of the consumed electric power by the rectification circuits increases, increasing the number of the group-divisions does not mean an effective way to increase the amount of the generated electric energy continuously.

FIG. 11 shows an example of comparing the DC resistances and the amounts of the generated electric energies of a comparative vibration generator which has 12-pieces of magnets and 12 pieces of coils with those of the vibration generators relating to the first to third exemplified embodiments of the present invention.

Here, there is shown an example in which a comparison is made between the power-generation outputs of the vibration generators relating to the first to third exemplified embodiments, in which the vibrator 10 is provided with 12-pieces of magnets M1 to M12, and that of the power-generation output of the vibration generator 100 in the past. At that time, it is assumed with regard to the vibrator 10 that the resonant frequency thereof is 1 Hz and the possible vibration amplitude thereof is 50 cm.

With regard to the vibration generator 100 in the past (see FIG. 6), 12-pieces of coils C1 to C12 are connected in series and therefore, the DCR becomes the highest and the amount of the generated electric energy becomes the lowest.

On the other hand, with regard to the vibration generators 1, 20, 30 relating to the first to third exemplified embodiments respectively, the DCRs thereof become lower in this order and any one of those has twice or more amount compared with the amount of the generated electric energy of the vibration generator 100 in the past, and it is understandable that their power-generation outputs are larger.

It should be noted that it is also possible for the number of groups, by which the plurality of coils are divided, to be assumed as the total number of coils if considering a case in which one rectification circuit is connected for every one piece of coil. However, when the number of groups increases, the output voltage lowers and therefore, it is necessary to obtain the design in accordance with the required voltage for the load. Also, the same number of rectification circuits as the number of divisions is required and the cost thereof is required, so that it is necessary to provide an optimum design also in this point of view.

The power-generation output of the vibration generator is improved by using a vibrator provided with magnets whose same magnetic poles are faced to one another, by arranging winding-wire coils having the thickness approximately equal to a magnet-pitch among a plurality of magnets such that the adjacent coils will have mutually reverse winding directions and by employing a configuration in which the vibrator carries out reciprocating movement in the central core portions of the coils.

Also, by vibrating the vibrator 10 in the inside of the exterior case 3 depending on the end-portion spring 6a, the relative vibration with respect to the coils C1 to C12 of the vibrator 10 becomes a rectangular-wave shaped vibration. For this reason, it becomes possible to obtain the vibration generator 1 in which the resonant frequency of the vibrator 10 is made to be 1 Hz or less. Consequently, it is possible to dispose the vibration generator 1 in a marine buoy or the like.

It should be noted that it is allowed to design the numbers of coils for the respective groups to be different from one another.

Figure 12:
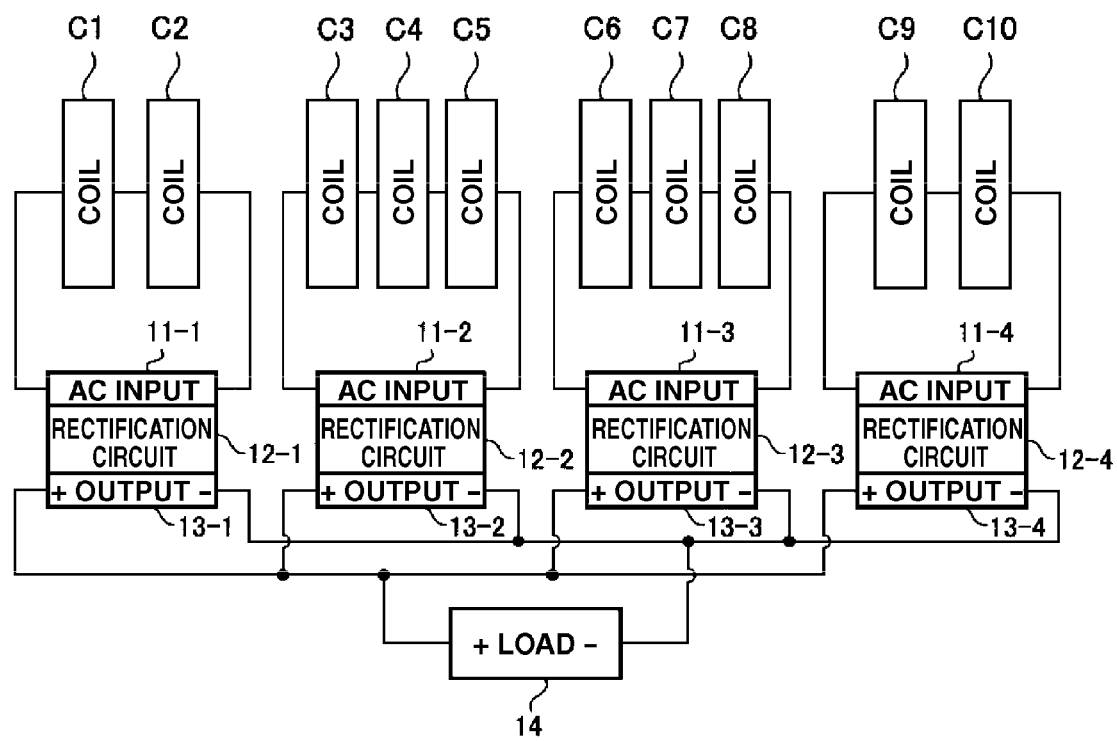
FIG. 12 is a block diagram showing a connection example of coils relating to a fourth exemplified embodiment of the present invention.

FIG. 12 is a block diagram showing an internal-constitution example of a vibration generator 40 in a case in which the numbers of coils are different for the respective groups.

In this embodiment, 10-pieces of coils C1 to C10 are divided into four groups. Here, in the respective groups, there are installed coils C1 & C2, coils C3 to C5, coils C6 to C8 and coils C9 & C10 by being divided. Then, AC input units 11-1 to 11-4, rectification circuits 12-1 to 12-4 and rectification output units 13-1 to 13-4 are connected to the coils which are connected in series within the respective groups similarly as those of the vibration generator 30 relating to the above-mentioned third exemplified embodiment.

In this manner, even if the number of coils included in each group is different, it is possible to obtain a sufficiently high amount of generated electric energy compared with a case of connecting all the coils in series.

It should be noted that the present invention is not to be limited by the exemplified embodiments mentioned above, and it is needless to say that it is possible to employ other various kinds of use-application examples and modification examples so long as not departing from the gist of the present invention described in the scope of claims.

The invention claimed is:

1. A vibration generator comprising:
   a housing that is elongated in a first direction, the housing having first and second housing ends, the first housing end being closer to a ground surface than the second housing end;
   a vibrator including a plurality of magnets whose same magnetic poles are arranged to face one another, the vibrator being located inside the housing, the vibrator being urged toward the first housing end of the housing by gravity;
   a first elastic unit which supports the vibrator, the first elastic unit vibrating the vibrator by a predetermined resonant frequency, the first elastic unit having first and second elastic unit ends;
   a tubular winding bobbin that extends in the first direction and that is located inside the housing, the vibrator and the first elastic unit being located in the tubular winding bobbin;
   a plurality of coils which are formed on an outer circumferential surface of the tubular winding bobbin and which are divided into two or more groups, the plurality of coils located in each of the two or more groups being connected in series;
   a plurality of rectification circuits, each of the plurality of rectification circuits rectifying an output voltage of each of the two or more groups of the plurality of coils; and
   second and third elastic units that are provided at the first and second housing ends of the housing, respectively, wherein
   first and second inner diameters of the second and third elastic units are larger than an outer diameter of the first elastic unit, and
   the first elastic unit end of the first elastic unit is connected to the first housing end of the housing, and the second elastic unit end of the first elastic unit is connected to the vibrator.

2. The vibration generator according to claim 1, wherein each of the plurality of rectification circuits is arranged in parallel with respect to a load.

3. The vibration generator according to claim 2, wherein a wound number of the plurality of coils in each of the two or more groups is two or more.

4. The vibration generator according to claim 3, wherein wire winding directions of the plurality of coils are mutually reversed for every two adjacent coils in each of the two or more groups.

5. The vibration generator according to claim 4, wherein wire winding directions of adjacent coils of the plurality of coils in different adjacent groups of the two or more groups are mutually reversed for every two adjacent groups of the two or more groups.

6. The vibration generator according to claim 1, wherein a wound number of the plurality of coils in each of the two or more groups is two or more.

7. The vibration generator according to claim 6, wherein wire winding directions of the plurality of coils are mutually reversed for every two adjacent coils in each of the two or more groups.

8. The vibration generator according to claim 7, wherein wire winding directions of adjacent coils of the plurality of coils in different adjacent groups of the two or more groups are mutually reversed for every two adjacent groups of the two or more groups.

9. The vibration generator according to claim 1, wherein a vibration frequency of the vibrator is 1 Hz or less.

10. The vibration generator according to claim 1, further comprising:
    a support that is in an elongated shape so as to pass through the vibrator and through the first through third elastic units.

11. The vibration generator according to claim 10, wherein
    a resonant frequency between the vibrator and the first elastic unit is 0.5 Hz.

12. The vibration generator according to claim 11, wherein vibration waves of the vibrator and the first elastic unit are approximately rectangular waves.

* * * * *